(12) United States Patent
Negron et al.

(10) Patent No.: US 11,453,989 B2
(45) Date of Patent: Sep. 27, 2022

(54) HYBRID WATER FILTERING CLEANING AND QUALITY MONITORING DEVICE

(71) Applicant: Remora Incorporated, San Juan, PR (US)

(72) Inventors: Omar J. Negron, Corozal, PR (US); Andrea Curet, Caguas, PR (US); Sunny Su, Raleigh, NC (US); Ben Markoch, Raleigh, NC (US)

(*) Notice: Subject to any disclaimer, the term of this patent is extended or adjusted under 35 U.S.C. 154(b) by 0 days.

(21) Appl. No.: 17/123,574

(22) Filed: Dec. 16, 2020

(65) Prior Publication Data
US 2021/0140132 A1    May 13, 2021

Related U.S. Application Data

(63) Continuation-in-part of application No. 16/597,717, filed on Oct. 9, 2019, now abandoned.

(60) Provisional application No. 62/744,076, filed on Oct. 10, 2018.

(51) Int. Cl.
| | | |
|---|---|---|
| *E02B 15/04* | (2006.01) | |
| *C02F 1/00* | (2006.01) | |
| *E02B 15/10* | (2006.01) | |
| *C02F 101/32* | (2006.01) | |
| *C02F 103/00* | (2006.01) | |

(52) U.S. Cl.
CPC .......... *E02B 15/046* (2013.01); *C02F 1/004* (2013.01); *E02B 15/10* (2013.01); *C02F 2101/32* (2013.01); *C02F 2103/007* (2013.01); *C02F 2201/008* (2013.01); *C02F 2201/009* (2013.01); *C02F 2209/008* (2013.01); *C02F 2303/04* (2013.01); *C02F 2303/24* (2013.01)

(58) Field of Classification Search
CPC ..... B01D 35/05; E02B 15/046; E02B 15/048; E02B 15/10; E04H 4/1263
USPC .... 210/747.6, 776, 85, 122, 170.05, 170.09, 210/170.1, 242.1
See application file for complete search history.

(56) References Cited

U.S. PATENT DOCUMENTS

| | | | | |
|---|---|---|---|---|
| 4,851,818 A | * | 7/1989 | Brown ................... | B01D 61/12 210/85 |
| 4,900,432 A | * | 2/1990 | Arnold .................. | E04H 4/1263 210/242.1 |
| 5,078,863 A | * | 1/1992 | Durigon ................ | E04H 4/1263 210/242.1 |
| 5,106,492 A | * | 4/1992 | Distinti ................. | E04H 4/1263 210/242.1 |
| 7,022,223 B2 | * | 4/2006 | Lovestead ............. | E04H 4/1263 210/170.05 |
| 7,037,038 B1 | * | 5/2006 | Haski .................... | E04H 4/1272 210/242.1 |
| 7,101,475 B1 | * | 9/2006 | Maaske ................. | E04H 4/1263 210/242.1 |
| 2006/0060513 A1 | * | 3/2006 | Craig .................... | E04H 4/1263 210/167.2 |
| 2007/0151914 A1 | * | 7/2007 | Riley .................... | E04H 4/1263 210/242.1 |
| 2007/0158253 A1 | * | 7/2007 | Kellett ................. | E02B 15/104 210/776 |

(Continued)

*Primary Examiner* — Christopher Upton
(74) *Attorney, Agent, or Firm* — University of Puerto Rico; Eugenio J. Torres-Oyola; Victor M. Rodriguez-Reyes (57) ABSTRACT

A hybrid water filtering cleaning and quality monitoring device integrates multiple elements into one main system, including oil filtering, bacterial management, trash collection and water quality monitoring.

6 Claims, 8 Drawing Sheets

(56) References Cited

U.S. PATENT DOCUMENTS

2012/0055856 A1\* 3/2012 Ratti .................... E02B 15/046
210/242.1

\* cited by examiner

HYBRID WATER FILTERING CLEANING AND QUALITY MONITORING DEVICE

CROSS-REFERENCE TO RELATED APPLICATIONS

This application is a Continuation-In-Part of U.S. Non-provisional patent application Ser. No. 16/597,717, filed on Oct. 9, 2019, and which is incorporated by reference in its entirety. Ser. No. 16/597,717 is a non-provisional application of U.S. Provisional Application Ser. No. 62/44,076, filed on Oct. 10, 2018.

BACKGROUND OF THE INVENTION

The goal of the device is to provide clean water in a particular area over time, allowing communities to become independent of outside aid and temporary solutions like water bottles and life straws. It also allows local governments and non-governmental organization to create collaborative ties with the community by exchanging snapshots of water quality monitoring of the water being processed by the machine, gallons consumed and running hours of the device.

BRIEF SUMMARY OF THE INVENTION

Obtaining potable water can be a challenge for communities and countries where fresh water is not adequate for drinking, because it must be treated or purified before it can become potable. This hybrid water filtration device can be adapted in order to be portable for home use or anchored to the water source for daily production of potable water for the consumption of the community.

The device is an easily portable, easy-to-install water filtration device that allows communities to take direct and immediate action when it comes to cleaning their most important water sources. The invention works by cleaning water at its source, rather than after it has been transported or by transporting the filtered water. All of the embodiments that contain the water filtration systems can be used to clean and monitor the quality of natural water bodies and provide drinking water. Similarly, the water filtration systems can be used in man-made structures such as large water tanks, large fish tanks, lakes, local water systems, water wells, and industrial water systems.

The effects of the device on the quality of water has been evidenced with the results that were obtained from the water quality tests that were conducted. Initial water quality tests conducted, including chemical and physical testing, were done with a sample of river water collected from the filtering device. Results of these initial tests demonstrated that this filtration system bettered the quality of the river water demonstrating a pH level of 6.1, dissolved oxygen level of 80%, no presence of *Escherichia coli* (*E. coli*), and no turbidity. Further tests were conducted with samples of water collected directly from the river. Specifically, samples were collected from two areas of the river: upstream and downstream from where the filtering device was placed, after a month of uninterrupted filtering. The tests results demonstrated that the quality of the river water downstream from the filtering device was significantly better than that of the river water upstream from the device (unfiltered). The samples collected upstream from the device, or that were unfiltered, had a pH level of 8.8, a level of dissolved oxygen of 130%, presence of *E. coli,* and had a medium level of turbidity. On the other hand, samples of river water collected downstream from the filtering device, thus being partially filtered by the device, demonstrated less acidity (pH level of 7.5), lower percent of dissolved oxygen (90%), no presence of *E. coli,* and no turbidity.

DETAILED DESCRIPTION OF THE INVENTION

Water purifiers absorb polluted water out of natural water courses and exports said liquid onto a different container. The machine works by, on the same place, filtering small debris, chemicals, and other biohazards from localities like rivers, ponds, lakes and streams. This allows the purification of water to be easier to manage and obtained by eliminating the requirement of a clean water storage container. This disclosure integrates multiple elements into one main system such as: oil filtering, bacterial management, and water quality monitoring. It works with a hybrid filtering system to adapt to every kind of water source; using an active filtering system in calm water sources and a passive filtering system in vivid water sources.

The active filtering system consists of an embodiment that simulates a fish/marine animal and moves through the body of water with a chain attached to the initial anchor of the machine. This allows the device to reach water from different areas of the body of water, allowing the filtering and water quality monitoring to take place in diverse areas of the body of water, and in areas where there are not enough streams, currents, or waves that move the device. While it travels through the body of water, water that enters the system moves through the filtering system and the clean water is then returned to the source. The passive filtering system refers to the box embodiment anchored at the edge of a body of water. The water it attracted to the embodiment by the movement of the natural body of water, thus consuming less solar energy. The passive filtering system is adequate for both calm and rough bodies of water. The passive filtering system preferably has two outlets: one outlet is used to collect potable and clean water for its daily consumption and the second outlet consists of a hose that extends back into the river, constantly returning clean water to its source, and consequently bettering the quality of the body of water in proximate areas. The pumping and filtering of the machine is powered by solar energy, through a solar panel that is attached to an "inverter" and a battery placed inside the machine.

The filtration system arises from the union of three different commercial filters that work simultaneously to remove contaminants from the body of water and to provide potable drinking water to communities. The first filter is a carbon block filter with polypropylene spun filter which removes small particles, sand, dirt, dirt particles, and sediments. This filter also removes chlorine and neutralizes the flavor and odor of the water. For the box embodiment, this filter is twenty (20) inches long and for the home and the Ser. No. 16/597,717 device the carbon block filter is twelve (12) inches long. The purpose of having two different filter sizes is based on the fact that the box embodiment is used in bodies of water with a higher presence of solid waste while the others two devices are used for bodies of water with more chemical and biological contaminants. The second filter is a deionization and carbon filter, because it has a high filtration capacity and long-term durability. This filter eliminates chlorine, mercury, heavy metals, detergents, dyes and Volatile Organic Compounds (VOC). It also reduces and eliminates turbidity, odors and bad tastes from the water. In the preferred embodiment the deionization and carbon filter should be 3.7×4.65×1.26 inches. The third filter for the water filtration device is a reverse osmosis filter. Reverse osmosis filters function by sending water through one or more small filters that are perforated with hundreds of tiny holes. This allows for pure water molecules to pass through while unwanted contaminants are eliminated thus making the water drinkable and safe. In order for the device to continue producing high quality potable drinking water, the inner cartridge of the reverse osmosis filter and carbon block filter must be replaced every 6 months. The deionization and carbon filter must be changed every 3 years. The water filtration system has a potable water production capacity of 3,000 gallons of water per day on the preferred embodiment.

Typically, this mechanism requires larger equipment and a group of specialized human assistance, while the present invention simplifies the task; moreover, the invention's functionality and quality can be monitored remotely. The embodiment features an easily portable and to install water filtration device by cleaning water at its source, rather than after it has been transported.

Communities and home users can be easily trained on how to maintain the filtration systems. When it is time to replace the filters, the previously installed filters are commercially available filters.

Figure 1:
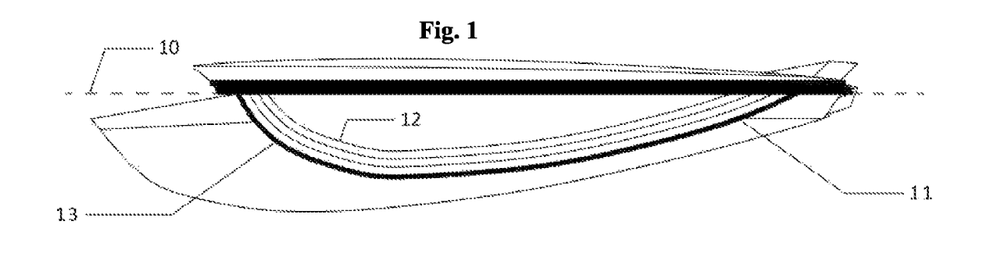
FIG. 1 shows the side-view of the embodiment.

Referring to FIG. 1, shown is an embodiment in which 10 demonstrates the water level that it is positioned to receive polluted water by intake 11 and pass it through gradient density filters 12 that eliminate chemicals, bacteria, biohazard, and microplastics, in order to produce clean water outtake 13.

Figure 2:
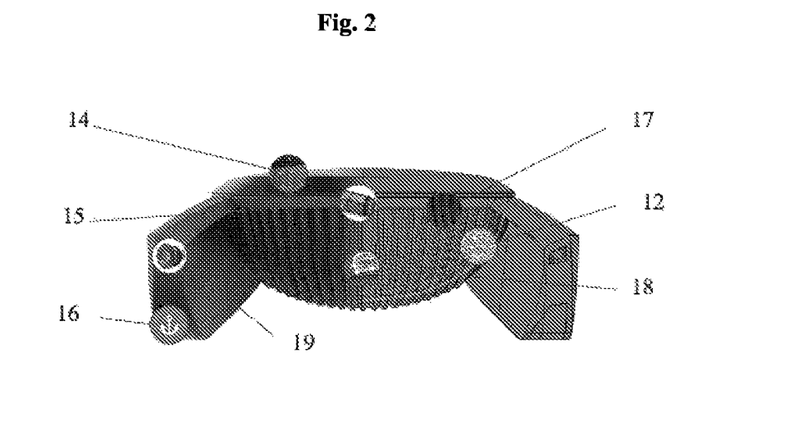
FIG. 2 shows the back-view of the embodiment.

Referring to FIG. 2, a back-view of the embodiment, shows that the body contains flexible solar panels 14 which contour to its' shape and provide constant and renewable power; a front sensor GPS and radio/controller rear sensors and camera 15 to monitor water quality and provide visual feedback; and a retractable anchor 16 to allow it to stay in the water. This is all part of a corrugated shell 17 which prevents overly large debris from clogging the gradient density filters 12 which may vary in size. It is powered by a high-efficiency engine 18 which relies on auto adjusting speed for intake and outtake which allows the appropriate amount of water to be filtered without clogging. Finally, it has an LED light 19 for visual performance indication.

Figure 3:
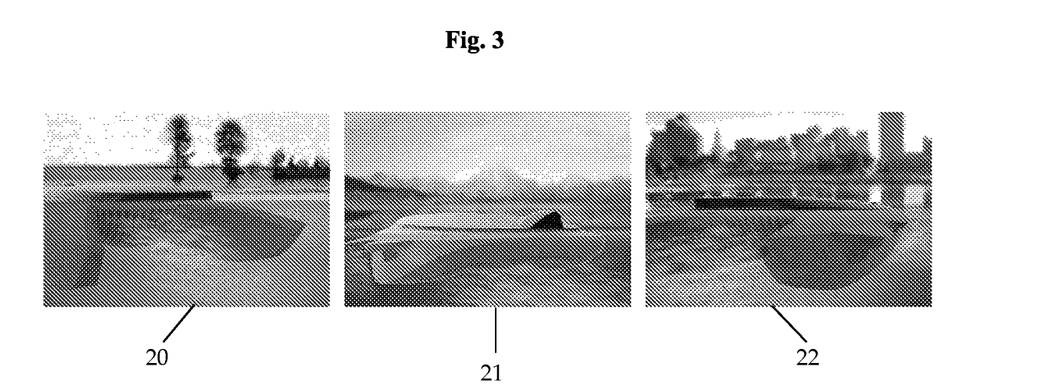
FIG. 3 shows exemplary fields of application and uses of the embodiment.

Referring to FIG. 3, shows exemplary fields of application and uses here disclosed. The embodiment can, but is not limited to, the use in swamp or low-country 20 by being tethered to a tree, other stationary object or to solid earth and removing slime and chemical build up. It can also be used in lakes or estuaries 21 by anchoring to the lakebed which allows it to function with minimal movement and also removes harmful bacteria. It is also promoted its use in rivers and streams 22 in which it can be tethered to any fixed object and can help remove debris without harming wildlife.

Figure 4:
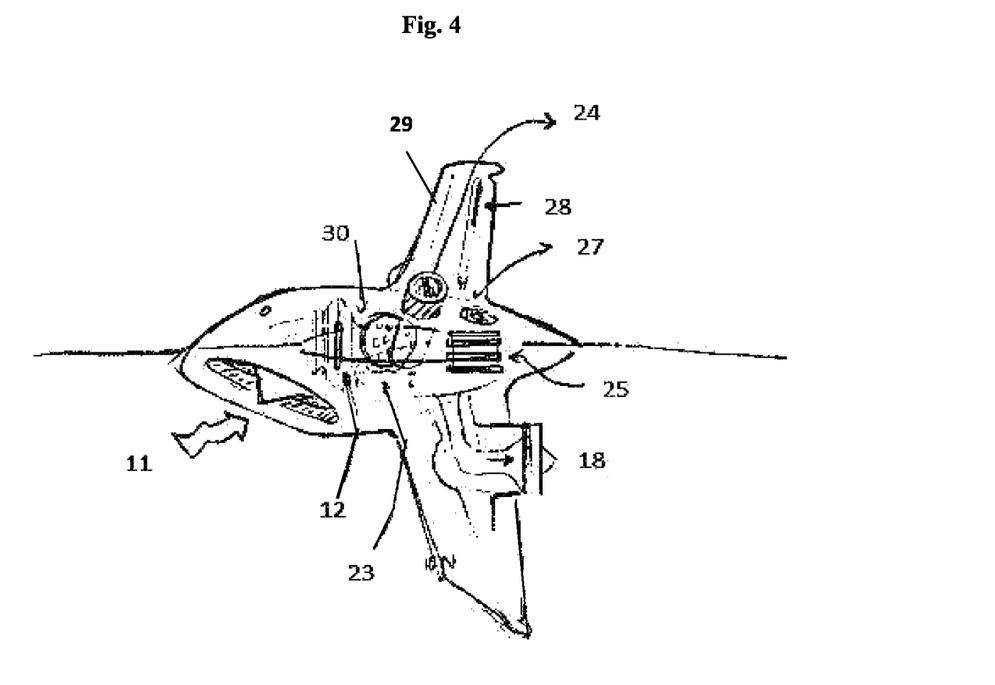
FIG. 4 shows a top view of the embodiment.

Referring to FIG. 4, a top view of the embodiment, an intake channel 11 receives water which proceeds to pass through organic filters 12 and decontamination cells 23, as well as a filter which removes biohazard waste 24 and culture chambers 25; all of this is powered by an engine 18. The outside of the invention includes a buoyancy valve 27 and reflector 28. From the top view, the right side of the invention possesses an antenna 29 and stabilizer fin 30.

Figure 5:
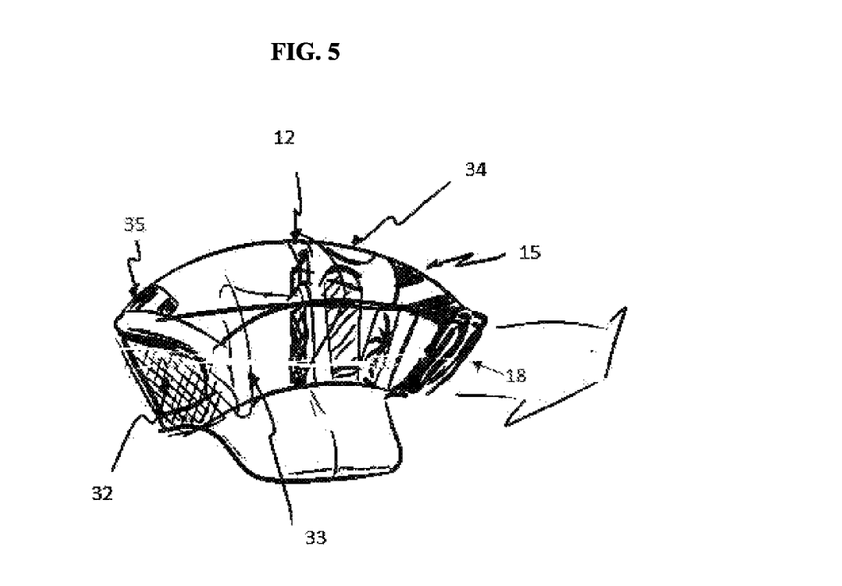
FIG. 5 shows another side-view of the embodiment.

Referring to FIG. 5, a side-view of the embodiment, water enters through the left side, where it first is filtered by a grate 32 to block larger organisms. It proceeds to pass through a capture system 33 and a filter 12 collecting large organic matter, followed by another filter 34 to siphon microbial lifeforms. Finally, an engine 18 propels the machine. The invention also contains a front sensor GPS 35 and radio/controller rear sensors 15.

Figure 6:
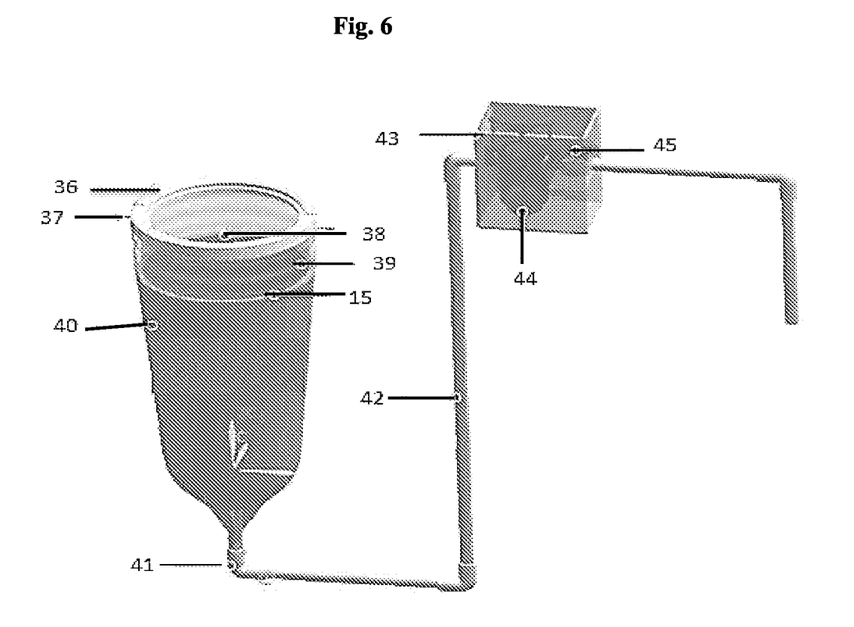
FIG. 6 shows an earlier prototype of the embodiment.
Figure 7:
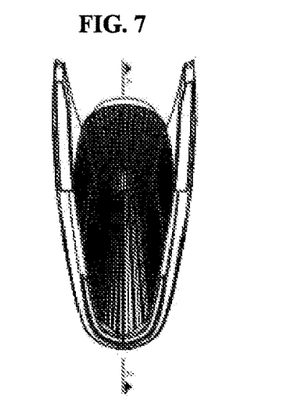
FIG. 7 shows a top view of an embodiment of the invention.
Figure 8:
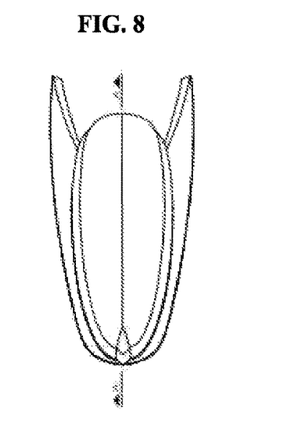
FIG. 8 shows a bottom view of an embodiment of the invention.
Figure 9:
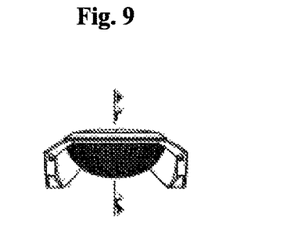
FIG. 9 shows a front elevation view of an embodiment of the invention.
Figure 10:
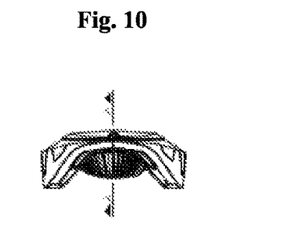
FIG. 10 shows a back-elevation view of an embodiment of the invention.
Figure 11:
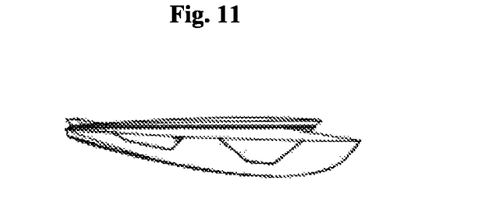
FIG. 11 shows a right elevation view of an embodiment of the invention.
Figure 12:
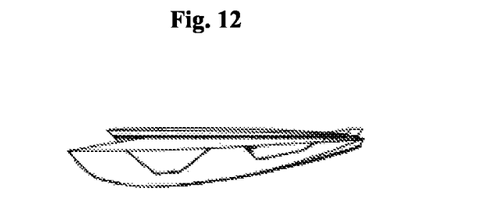
FIG. 12 shows a left elevation view of an embodiment of the invention.

Referring to FIG. 6, an earlier prototype of the apparatus consisting of a plastic ring 36 above an aluminum ring 37. Inside is a mesh bag 38 connected to a flex foam tube 39 and Arduino sensors 15. This is connected to an aluminum tube 40. This body leads to PVC connectors 41 and PVC tubes 42 which lead to PVC panels secure box 43, comprising an oil filter 44 and water pump 45. FIGS. 7-12 show several different views of the embodiment.

Figure 13:
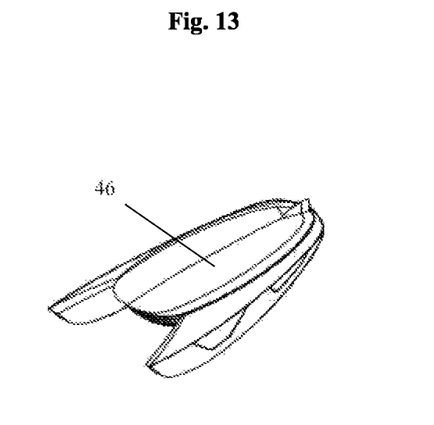
FIG. 13 shows an isometric view of an embodiment of the invention.

Referring to FIG. 13, an isometric view of the embodiment, shows the top of the embodiment which has a lid 46 that can be opened to easily access the inside machinery.

Figure 14:
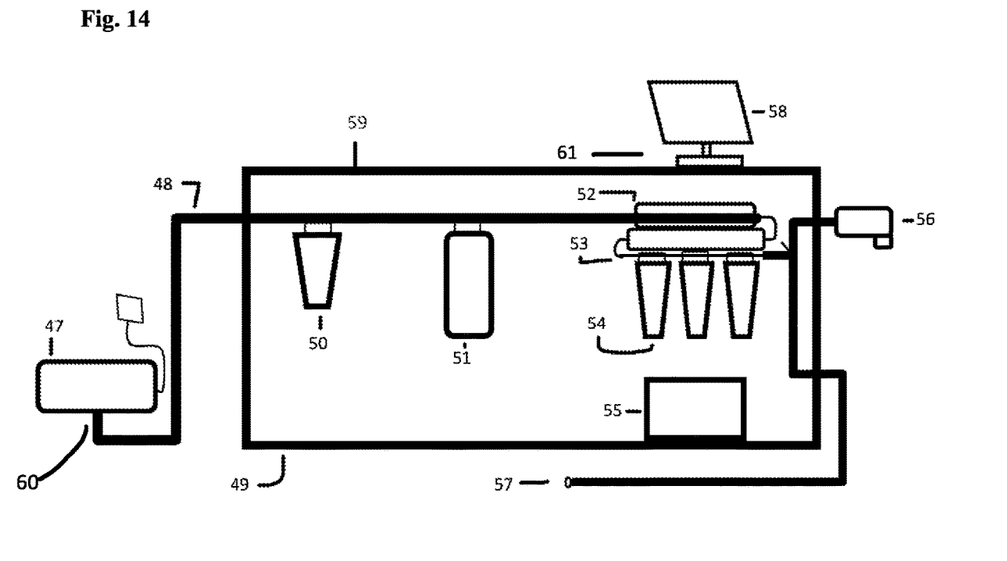
FIG. 14 shows the frontal plan view of the inside elements of the box embodiment.

The box hybrid water filtration system embodiment is shown best in FIG. 14. It generally comprises a container 49 having front and rear walls, left and right walls, a base wall and a removable top lid 59. It comprises three filters. The first filter is a carbon block with polypropylene spun filter 50 because of its capability to collect all the physical components such as sand, soil, sediments, among others. The second filter is the deionization and carbon filter 51 since it removes all the main chemical contaminants such as chlorine, bacteria, detergents, dyes, among others. This filter is placed second because it does not have the ability to remove physical compounds. Deionization is the removal of all ionized minerals and salts (both organic and inorganic) from water through the process of ion exchange. Because most non-particulate water impurities are dissolved salts, deionization produces high purity water that is generally like distilled water, but compared to distillation deionization is much faster, less energy-intensive, and more cost-effective. In addition, it is an on-demand process that supplies large amounts of highly purified water as needed. Deionization removes total dissolved solids (TDS) from water using ion exchange resins, controlling the electric charge of ions in the water to remove the TDS. The third filter is the reverse osmosis filter 52, 54 since it is responsible for converting the source water into potable water and eliminates turbidity, rust and bad odors that may remain at the end of the filtration process. By far the most significant element of this filtration device is the unique combination of deionization 51, carbon 50 and reverse osmosis 52,54 filters, since contrary to prior art, it does not require water to be free of sediments before its filtration. This filtration device can clean water from any source and any condition.

The water enters the lower part of the machine with the force generated by the water pump 47. The diameter of the intake opening 60 is three (3) inches wide. The filtered water passes through PVC Schedule 40 or PVC Schedule 80 pipe, sizes ½ to 2 inches 48. Then, the water passes through the filters 52 and 54 (reverse osmosis filters) that are joined by flexible hoses (hose pipes) 53 with diameters ranging from ¼ inches to 2 inches. Our filtration device has the capacity to filter water immediately it goes through the deionization 51, carbon 50 and reverse osmosis 52,54 filters. It does not require the filtered water to be processed through a batch treatment bank for an elapsed period of time before it is ready for human consumption.

The filtered water can exit the filtering system in two ways: one is by being expelled directly to the body of water through a PVC pipe 57 located at the lower part of the System and the second exit 56 is located at the upper part where drinking water can be collected through a faucet. If the PVC pipe that goes to the bottom of the machine is eliminated, then there would be no direct and constant outlet to the body of water, but filtered water can be collected through the upper exit 56. All parts of the preferred embodiment are removable if necessary. The reverse osmosis filters in the preferred embodiment may be substituted with a filter with desalinating capacity. The box hybrid water filtration system is powered with a twelve (12) volt (700 to 900 mAh), water-resistant battery 55, which is placed inside the box embodiment and which is attached to a power inverter 61 and a 24 to 300 watt, water-resistant solar panel 58.

Figure 15:
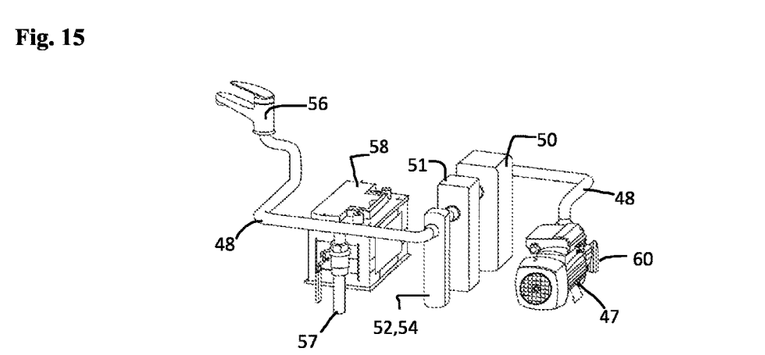
FIG. 15 show a side-view of the filtration device
Figure 16:
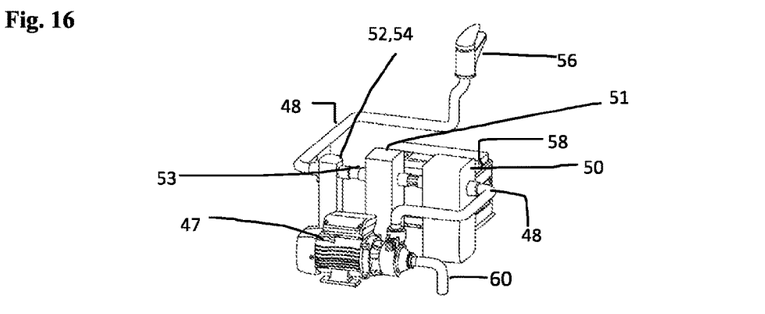
FIG. 16 shows a back view of the filtration device
Figure 17:
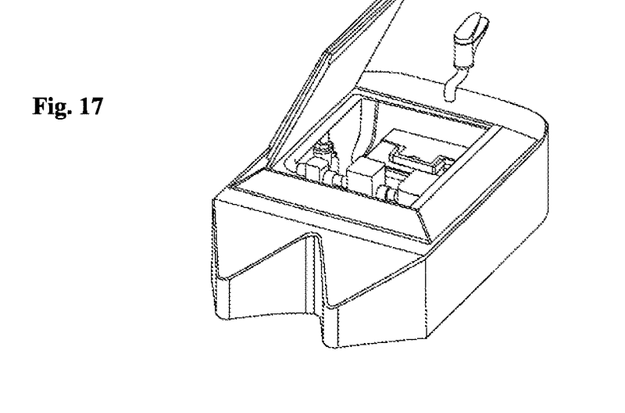
FIG. 17 is a top plan view of the filtration device inside the portable container

The preferred embodiment of the filtration device can be best seen in FIGS. 15-16. The filtration device has a 3.7× 4.65×1.26 inches deionization filter 51, a twelve inches long carbon block filter 50 and reverse osmosis filter 52,54. This filtration device can be inserted in a portable embodiment as shown in FIG. 17. It has a top lid that carries the water-resistant solar panel 58.

It is understood that numerous additions, modifications and substitutions can be made to this filtration device. For example, the filtration device in FIG. 15 can be adapted for home use. It is the filtration device without the elements of solar energy 58, battery 55 and housing/anchor 68. This home filtration device contains only the deionization 51, carbon 50 and reverse osmosis 52,54 filters and the PVC pipes 48 and is energized with the pressure/energy of that home's water and/or aqueduct system. This filtration system can be directly connected to the home's water system.

Figure 18:
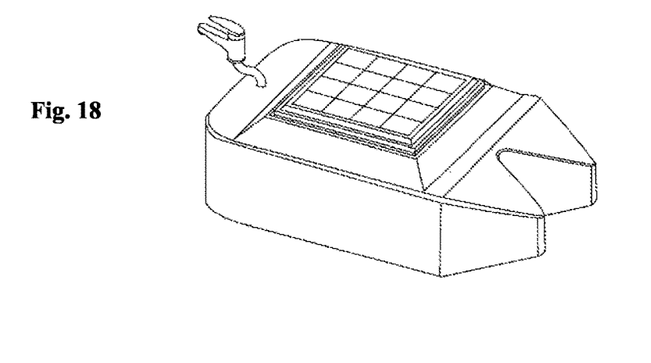
FIG. 18 shows the side view of the portable container
Figure 19:
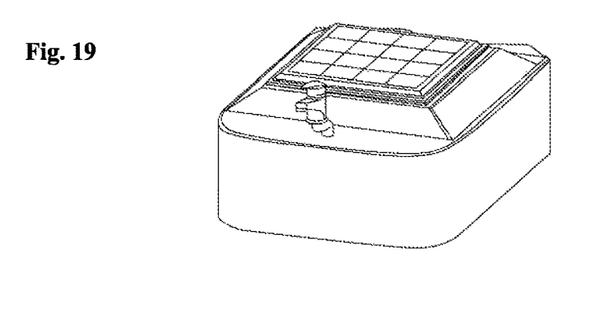
FIG. 19 shows a rear view of the portable container
Figure 20:
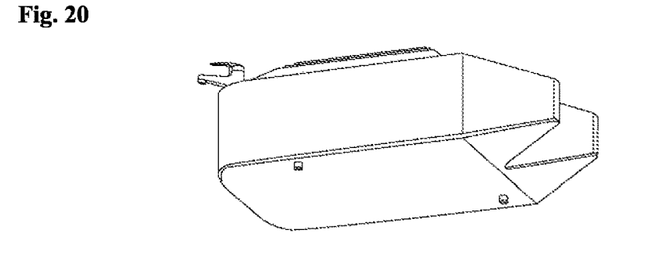
FIG. 20 shows a bottom view of the portable container
Figure 21:
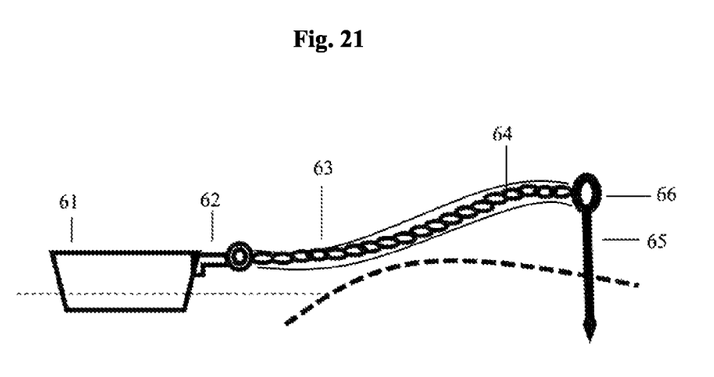
FIG. 21 shows the anchoring system

An alternative embodiment of this filtration device is best showed in FIGS. 18-20. Referring to FIG. 21, an anchoring system 62, 63, 64, 65, 66 which consists of a steel chain 64 with a rubber covering 63, an anchor joint 62 in the portable filtering device and a second anchor joint on the port 65. The anchor port 65 is made of a combination steel and metal tubes which are the size of the device 61. The main function of the anchoring system 62, 63, 64, 65, 66 is to keep the device in a set place in order to filter a determined area of water. The anchoring system 62, 63, 64, 65, 66 can also extend the device with the 64 to other adjacent areas of the body of water. This function is similar to the passive water filtering of the box embodiment in FIG. 14.

What is claimed is:

1. A water filtration machine comprising:
    a floating body comprising a water intake port, an antenna, and a stabilizer fin;
    a filtering system located inside of said floating body;
    a GPS located on a top front part of said floating body;
    at least one flexible solar panel configured to cover a top part of said floating body:
    a battery;
    an electric engine capable of automatically adjusting its operating speed;
    a retractable anchor;
    an LED; and
    a propulsion system;
    wherein said water intake port is configured to be located below a water level, receive polluted water and pass said polluted water through said filter, and
    wherein said filtering system conducts the active filter function.

2. A water filtration machine as recited by claim 1, wherein said filter comprises a plurality of gradient densities.

3. A water filtration machine as recited by claim 1, wherein said anchor is configured to be tied or tethered to a tree.

4. A water filtration machine as recited by claim 1, wherein said anchor is configured to be tied or tethered to the bottom of a body of water.

5. A water filtration machine as recited by claim 1, wherein said anchor is configured to be tied or tethered to any stationary object.

6. A passive water filtration machine comprising:
    a floating anchored body;
    an electric engine that activates a filter system, which also generates a propulsion system that is powered by a battery that is charged by a solar panel;
    wherein said filtering system conducts the passive filter functions;
    and an LED light that indicates the machine's filter condition, and
    an anchor that maintains the machine steady in a water body system.

* * * * *